Nov. 12, 1946.  H. N. DIMICK  2,410,965
LOAD HOIST AND GRAPPLING CONTROL
Filed Nov. 16, 1943  5 Sheets-Sheet 1

INVENTOR
HENRY NOEL DIMICK
BY
ATTORNEY

Nov. 12, 1946. H. N. DIMICK 2,410,965
LOAD HOIST AND GRAPPLING CONTROL
Filed Nov. 16, 1943 5 Sheets-Sheet 3

INVENTOR
HENRY NOEL DIMICK
BY

ATTORNEY

Nov. 12, 1946.    H. N. DIMICK    2,410,965
LOAD HOIST AND GRAPPLING CONTROL
Filed Nov. 16, 1943    5 Sheets-Sheet 4

INVENTOR
HENRY NOEL DIMICK
BY
ATTORNEY

Patented Nov. 12, 1946

2,410,965

UNITED STATES PATENT OFFICE 2,410,965

LOAD HOIST AND GRAPPLING CONTROL

Henry N. Dimick, Portland, Oreg., assignor to Willamette Hyster Company, Portland, Oreg., a corporation of Oregon Application November 16, 1943, Serial No. 510,571

9 Claims. (Cl. 214—65)

This invention relates to that class of automotive vehicles known as straddle trucks, used primarily for the transportation of loads such as stacks of lumber, boxed or crated shipments and the like, which are carried beneath the frame of the truck and between the wheels in straddled position. More particularly, the invention relates to a new and novel arrangement of elements for controlling operation of the load grappling equipment.

Straddle truck are designed to overrun a load, pick it up and carry it beneath the frame of the truck and between the wheels in straddled position. Each truck is provided with grappling means called "shoes" for engaging and carrying the load. In the instant invention the shoes are mounted upon swing posts mounted at each side of the truck midway between the front and rear wheels. The upper ends of the swing posts are interconnected by a rod which, though being extensible for purposes of initial adjustment, provides fixed points about which the posts swing to move the shoes between load engaging and disengaging positions. Each of the swing posts is provided with trunnions journaled in a slide mounted for limited movement transversely of the truck frame, and means is provided for imparting movement to each of these slides simultaneously in response to a control mechanism actuated by means of an operating lever in the operator's compartment.

A load hoisting mechanism is provided comprising lift chains trained over drive sprockets which are operatively connected by suitable shafts and gearing to a friction drive mechanism through which power is transmited from a prime mover. The friction drive is actuated by means of vacuum power devices under control of valve mechanism operated by a lever interconnected with the aforementioned operating lever in the operator's compartment. By reason of this construction, control of all of the various functions of the hoisting mechanism is had through the manipulation of but one lever mechanism.

It is, therefore, an object of the invention to provide in a straddle truck power devices for controlling the operation of the load grappling and hoisting mechanism, which power devices are actuated by an easily manipulated, manually controlled lever arrangement requiring a minimum of effort and attention on the part of the operator.

It is a further object of the invention to provide a new and novel arrangement of power devices for controlling the operation of work performing mechanisms, together with a simple arrangement of both manually and automatically controlled actuating means for energizing said power devices.

It is a further object of the invention to provide an improved mechanism for moving the load engaging shoes on a straddle truck relative to a load to be carried, for operating the hoisting mechanism to raise or lower the load, and for applying braking means to hold said hoisting mechanism in any desired position within the limits of the hoist travel, the several functions of which mechanism are under control of a single control lever element.

It is a further object of the invention to provide in a straddle truck an improved mechanism for moving the load grappling shoes into and out of load engaging position.

It is a further object of the invention to provide an improved mechanism on straddle trucks for controlling the operation of a friction drive between the prime mover and the lifting mechanism.

It is a further object of the invention to provide in a straddle truck means for increasing the usefulness of the truck and to provide a truck capable of efficient operation even in the hands of unskilled operators.

Figure 1:
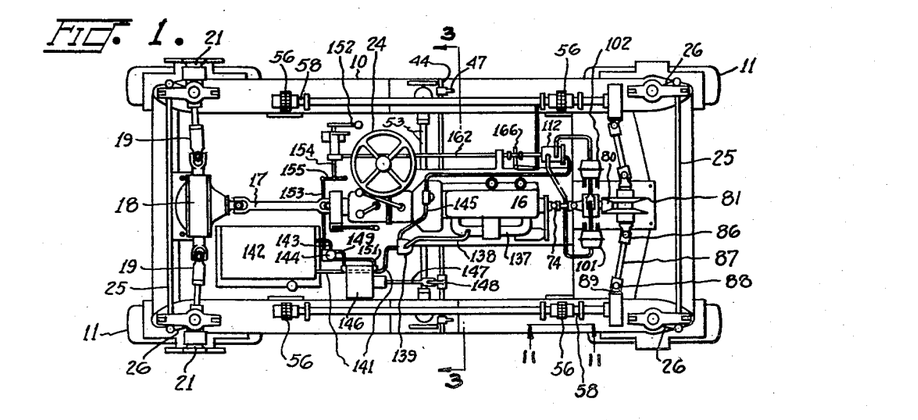
Figure 1 is a top plan view of a straddle truck embodying the invention.
Figure 2:
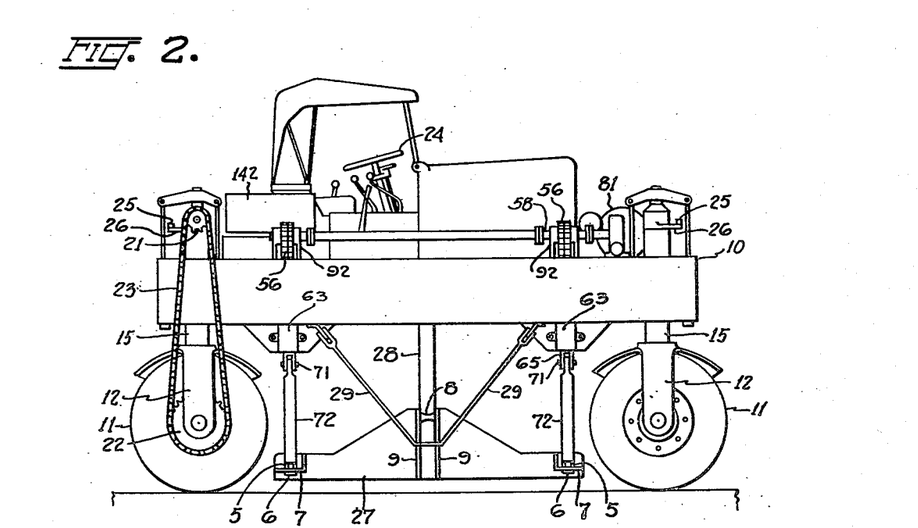
Figure 2 is a side elevation of the straddle truck shown in Figure 1.

Referring to Figure 2 of the drawings, there is illustrated a straddle truck comprising a main frame 10 mounted upon wheels 11 carried in wheel forks 12. Each frame member is rectangular in cross section, having spaced vertical walls 13 and 14. The stems 15 of the wheel forks extend vertically above the wheels and support the frame 10 at a height to permit the truck to overrun a load to be carried thereby and pick it up and carry it in a straddled position.

Power to operate the straddle truck is provided by a motor 16 from which power is transmitted by way of drive shaft 17 and differential gearing 18 to the drive axles 19. Sprockets 21 are mounted on the outer ends of the drive axles 19, and trained over the sprockets 21 and over wheel sprockets 22 are drive chains 23 by means of which power is transmitted to drive the wheels 11. The steering mechanism comprises the steering wheel 24, drag links (not shown) and tie rods 25 interconnecting steering arms 26. As is usual in trucks of this type, all of the operating mechanism, comprising both driving and hoisting mechanisms, is mounted above the frame 10 to provide a load space beneath the frame and between the wheels.

Figure 3:
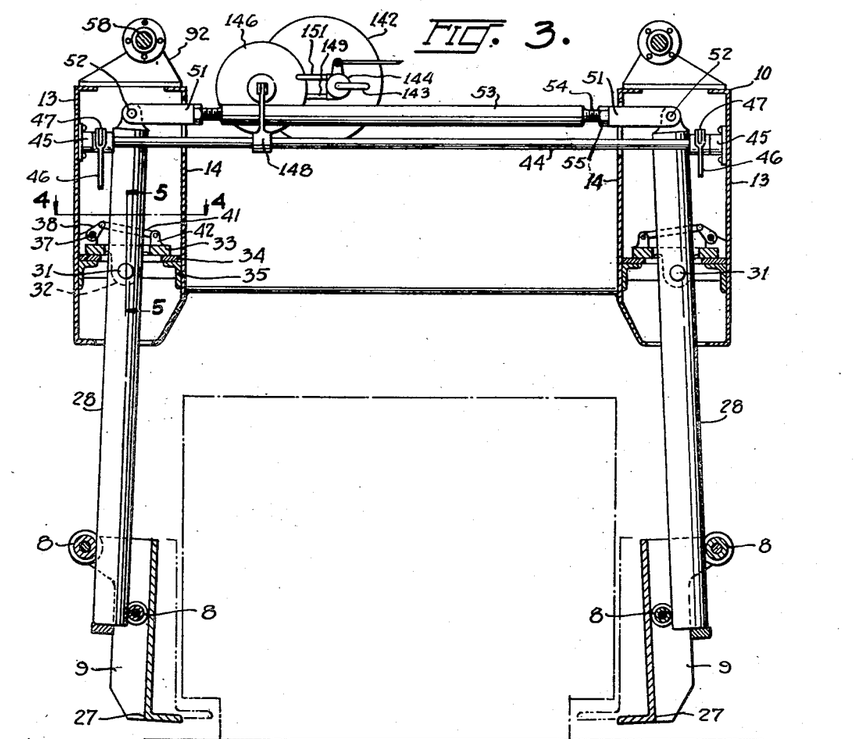
Figure 3 is a sectional elevation taken transversely of the truck on the line 3—3 of Figure 1, showing the construction of the means for supporting the load.

As best shown in Figures 2 and 3, the load grappling equipment comprises load engaging shoes 27 adapted to be moved vertically on swing posts 28 mounted in the frame 10 midway between the front and rear wheels on each respective side of the truck. Brace rods 29 extend between the frame 10 and the lower ends of the swing posts 28 to add rigidity to the structure. The brace rods 29 are fulcrumed at their connection to the frame 10 to permit them to swing with the swing posts 28.

As best seen in Figure 2, the shoes 27 extend longitudinally of the truck and are supported at their ends by links 72 directly connected to the lift mechanism. Each shoe 27 is provided with parallel vertical flanges 9 extending outwardly from the vertical flange of the shoe, the two flanges 9, 9 defining a guideway for the swing post 28. Rollers 8 journaled in the flanges 9, 9 have rolling engagement with the swing posts 28 for guiding the shoe during movement of the hoist. Each shoe is provided at its ends with horizontal flanges 7, each flange being perforated for receiving therethrough the shank of a bolt 6 which supports the shoes on the lower ends of the links 72. Each link 72 carries at its lower end a nut 5 for receiving the threaded end of the bolt 6. The shoes 27 are mounted loosely on the bolt 6, the latter being of sufficient length to permit vertical movement of the shoe on the shank of the bolt in the event the shoe should strike an obstruction during lowering movement of the hoist mechanism. The shoes are rotatable about the swing posts 28 in a horizontal plane, the loose connection between the ends of the shoes and the links 72 permitting the shoes to align themselves with a load which may be angularly and laterally misplaced relative to the center line of the straddle truck.

Figure 4:
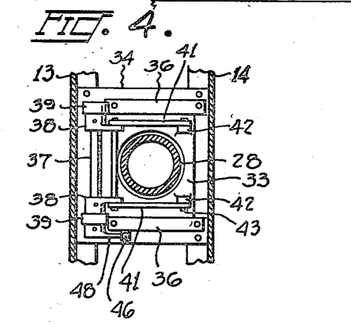
Figure 4 is a plan view, partly in section, of the means for moving the load supporting elements into and out of engagement with a load, taken on the line 4—4 of Figure 3.
Figure 5:
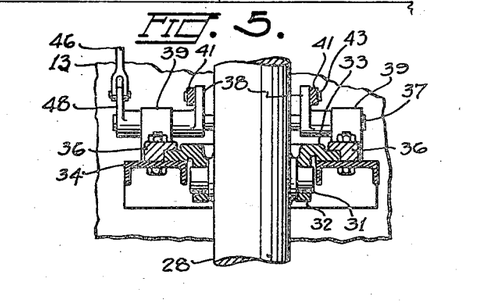
Figure 5 is a fragmentary sectional view, taken on the line 5—5 of Figure 3.

Each swing post 28 is provided with trunnions 31 journaled in bearings 32 mounted on a slide 33 slidably mounted on a supporting structure extending between and secured to the spaced wall portions 13 and 14 of the frame 10. The structure may comprise members 34 supported upon angle members 35 fastened to facing surfaces of the frame walls. Both the members 34 and slides 33 are provided with openings for receiving the swing posts 28 therethrough. The slides 33 are movable transversely of the frame 10 in grooved guides 36 bolted to the supporting structure. A shaft 37 having crank arms 38 is journaled in bearings 39 mounted on each of the supporting structures. Links 41 connect the crank arms 38 with bosses 42 on the opposite edge of each slide 33, to which the end of each link 41 is pivotally attached as by pins 43. The slides 33 are controlled by a mechanism comprising a shaft 44 extending transversely of the truck and journaled in bearings 45 suitably mounted on the outer walls 13 of the frame 10. Links 46 connect levers 47 mounted on the shaft 44 with levers 48 mounted on the shafts 37 whereby rotation of shaft 44 imparts simultaneous rotary movement to each shaft 37. Rotation of the shafts 37 in one direction tends to straighten the joint between the crank arms 38 and the links 41 and moves the slides 33 transversely of the frame 10 to their innermost positions. This movement of the slides 33 swings the lower ends of the swing posts 28 inwardly of the straddle truck and moves the load engaging shoes 27 into position to pick up the load, as shown by broken lines in Figure 3. Rotation of the shaft 37 in the opposite direction causes the links 41 and crank arms 38 to move to collapsed position, whereupon slides 33 are moved outwardly of the frame 10 to cause the swing posts 28 to swing outwardly to the positions shown in full lines in Figure 3.

At their upper ends the swing posts 28 are interconnected by a rod comprising at each end thereof a link 51 connected to the upper end of the swing post by means of a pin 52. The links 51 are of insufficient length to meet in end to end abutting relation transversely of the truck, and to complete the connection between the upper ends of swing posts 28 a rod 53 is provided having threaded ends 54 received within nuts 55 carried on the free ends of the links 51. Adjustment of the nuts 55 relative to the rod 53 determines the distance between the load engaging shoes 27 prior to manipulation of the slides 33 for moving the shoes into and out of load engaging position.

Figure 11:
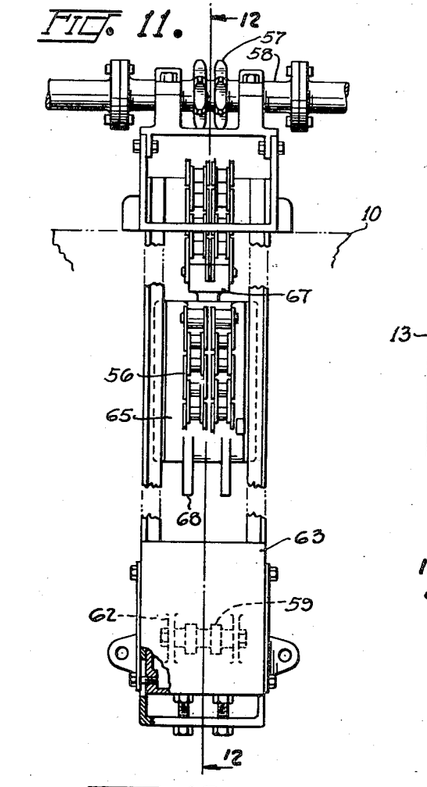
Figure 11 is a longitudinal elevation taken on the line 11—11 of Figure 1 and showing the construction of the mechanism for raising and lowering the load.
Figure 12:
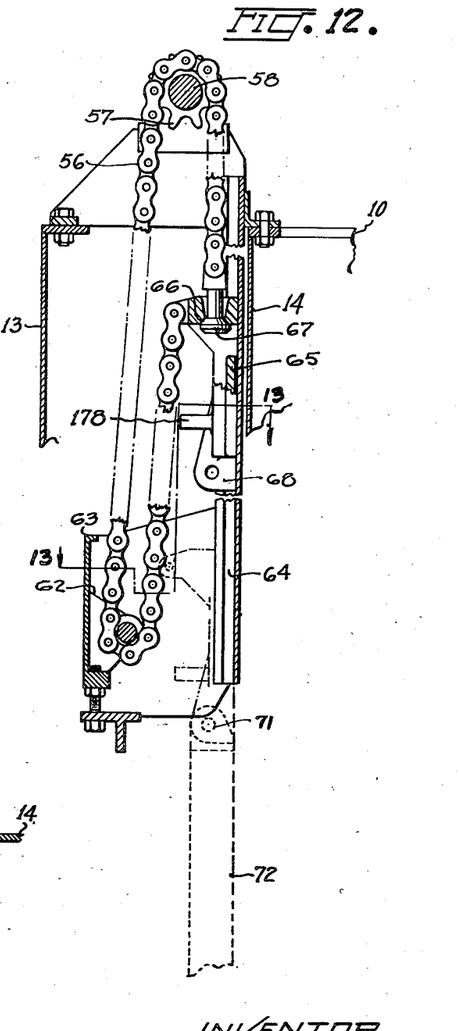
Figure 12 is a sectional elevation taken on the line 12—12 of Figure 11.
Figure 13:
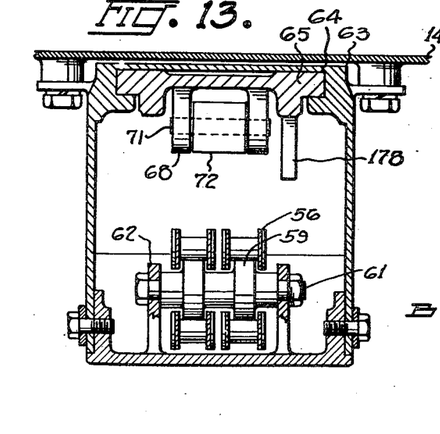
Figure 13 shows a section taken on the line 13—13 of Figure 12.

For moving the load engaging shoes 27 vertically of the swing posts 28, as for clamping a load between the shoes and the under side of the frame 10, there is provided a hoisting mechanism comprising lift chains 56, the arrangement of which may better be understood by reference to Figures 11, 12 and 13. The lift chains shown are of multiple width, each chain being trained over pairs of sprockets 57 mounted on drive shafts 58 and over idler sprockets 59 mounted on stub shafts 61. The stub shafts 61 for the idler sprockets 59 are carried by standards 62 mounted adjacent the lower end of a frame 63 providing therewithin a grooved track 64 for a cross head 65. The tracks 64 are arranged vertically of the frame 63, and the cross heads are moved vertically relative to the frame in response to operation of the chains. Each cross head 65 is provided adjacent its upper end with a socket 66 for receiving the head of a pin 67 secured to one end of each of the lift chains 56. The socket 66 provides with the pin 67 a swivel coupling between the chain 56 and the cross head 65. The socket 66 is flared upwardly to permit the pin 67 to align itself with the chain 56 to insure that the pull will be distributed equally throughout the cross sectional area of the chain. From thence each lift chain 56 is trained over drive sprocket 57 and idler sprocket 59 and is connected to the cross head 65 at a point adjacent the connection for the pin 67. At its lower end the cross head 65 is provided with parallel flanges 68 having aligned apertures 69 for receiving therethrough a pin 71. The link 72 is journaled on the pin 71 and extends between the cross head 65 and the load engaging shoe 27, being secured to the latter by means of the bolt 6 and nut 5 hereinbefore described.

*Friction drive for hoisting mechanism*

Figures 6, 7:
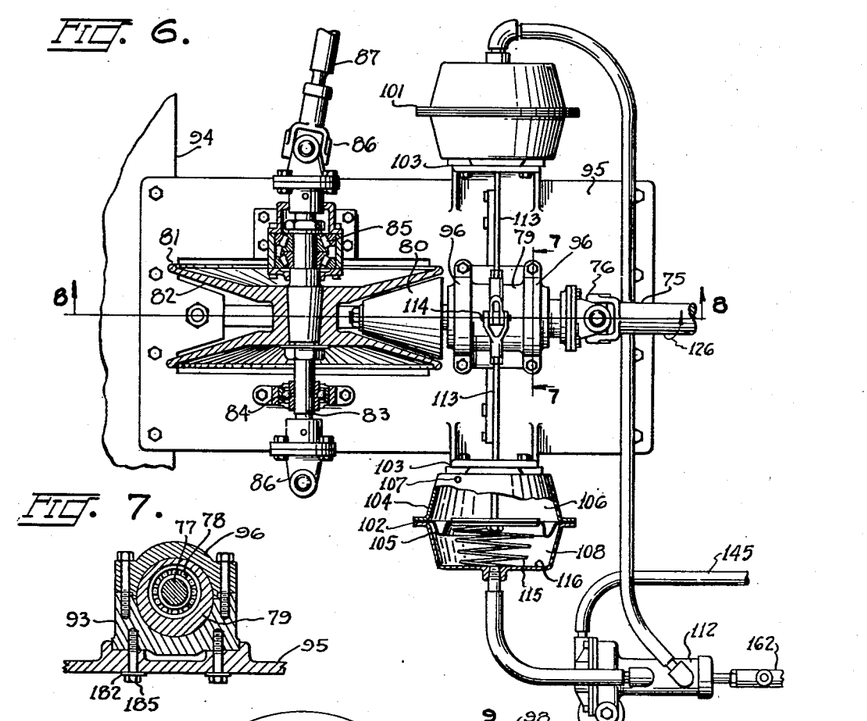
Figure 6 is a top plan view, partly in section, of the friction drive for operating the lift chains.
Figure 7 is a section taken on the line 7—7 of Figure 6.
Figure 8:
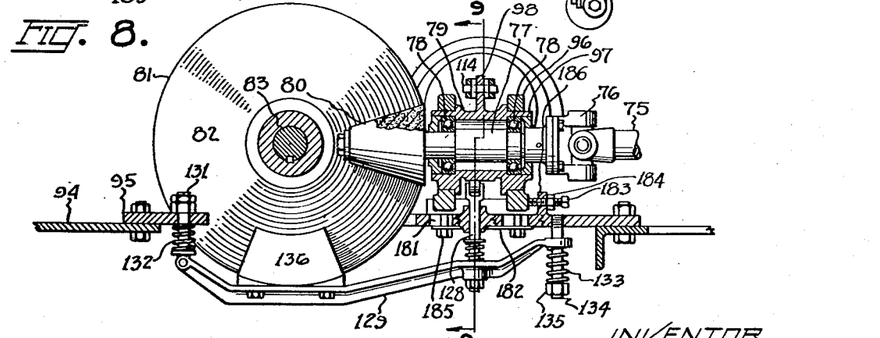
Figure 8 is a longitudinal sectional elevation of the friction drive, taken on the line 8—8 of Figure 6.

At the forward end of the motor 16 the drive shaft 17 is connected by means of a flexible coupling 74 to a shaft section 75 which in turn is connected through a flexible coupling 76 to a shaft section 77 journaled in bearings 78 carried in a housing 79. The forward end of the shaft section 77 is provided with a friction cone 80 arranged between the inner sides of a friction transmission wheel 81 formed of two frusto-cones connected together at their smaller ends and forming a V-shaped annular groove 82 therebetween. The friction wheel 81 is keyed to a shaft 83 journaled in bearing 84 and 85 and connected at each end through flexible couplings 86 with shaft sections 87. The shaft sections 87 are in turn connected through flexible couplings 88 to shaft sections 89 provided with worm gears (not shown) which mesh with gears 91 keyed to the ends of shafts 58. The shafts 58 extend longitudinally of the truck, being journaled in bearings 92 mounted on frame members 10. Mounted on the shafts 58 are the pairs of sprockets 57 over which are trained the lift chains 56 hereinbefore described.

The housing 79 is of generally cylindrical shape and is rotatably supported in a block 93 slidably mounted on a grooved plate 95 fastened to the frame member 94. The position of the block 93 is adjustable in a direction longitudinally of the shaft 77 to provide for movement of the friction cone 80 toward or away from the friction wheel 81, both for purposes of initial adjustment of these parts and to compensate for wear. Slots 181 in the frame member 94 extend in a direction parallel to the shaft 77 for receiving therethrough bolts 185 which engage in tapped recesses in the block 93. The heads of the bolts 185 engage under a strip washer 182 against which lock washers are seated. An adjusting screw 183 equipped with a lock nut 184 forms with a boss 186 a stop against which the block 93 bears when the friction cone 80 is moved into engagement with the friction wheel 81. The block 93 is provided with spaced clamps 96 which engage around opposite end portions 97 of the housing 79. Between the clamps 96 the housing 79 is provided with an upstanding lever arm 98. The lower surface of the housing 79 is provided with outwardly projecting cam surfaces 99 defining a recess 100 therebetween.

Figures 9, 10:
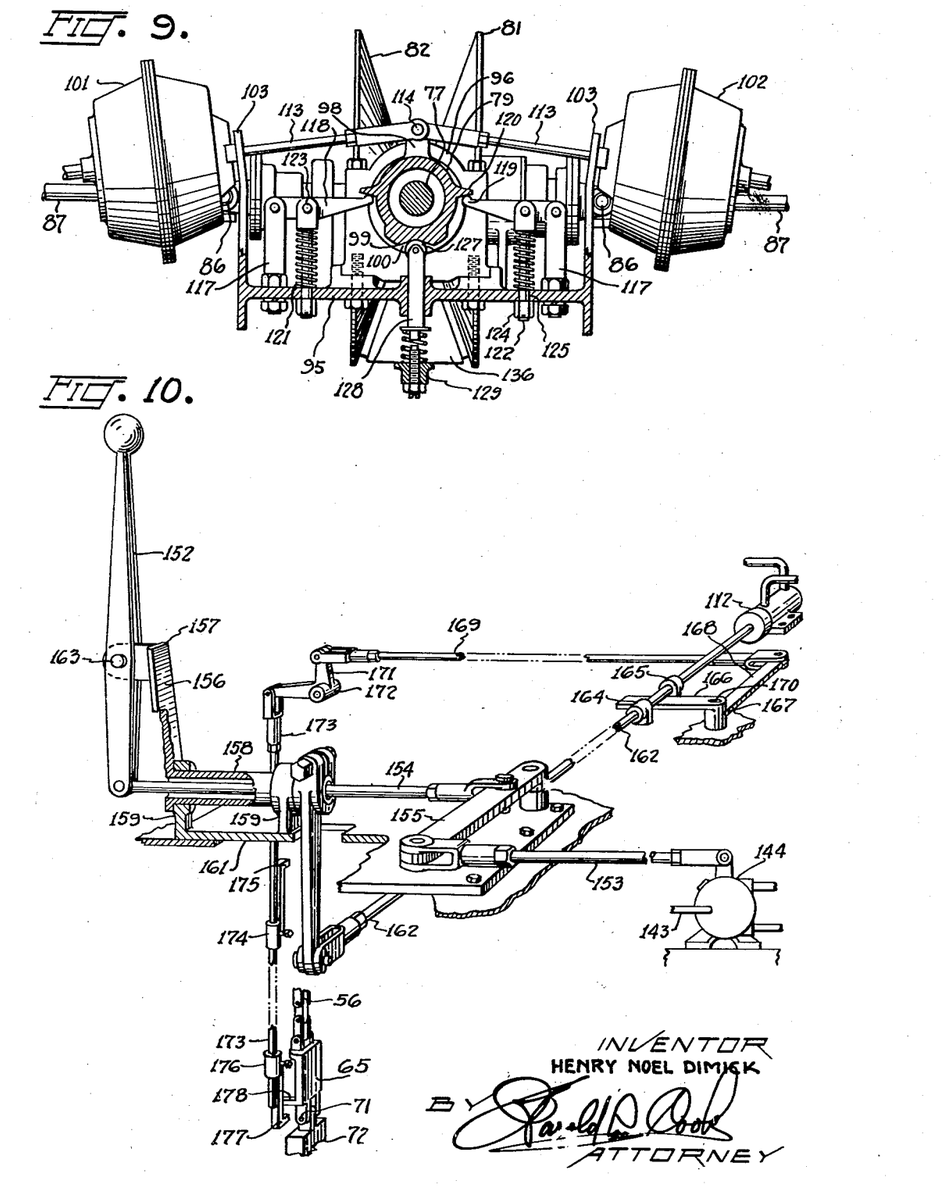
Figure 9 is a sectional elevation taken transversely of the straddle truck on the line 9—9 of Figure 8.
Figure 10 is a diagrammatic representation of the control elements for the friction drive.

Bearings 78 carried within the housing 79 for supporting the shaft 77 are mounted eccentrically of the housing so that rotation of the housing operates to move the shaft 77 laterally of the housing 79 and the friction cone 80 into engagement with one or the other of the frusto cones comprising the friction wheel 81, according to in which direction the housing is rotated. For imparting rotary movement to the housing 79 there is provided a pair of oppositely disposed vacuum power devices 101 and 102 bolted to upstanding flanges 103 on the frame member 94. Each of these devices comprises a casing 104 containing a flexible diaphragm 105 secured between the two halves of the casing and dividing the casing on a medial line to form two chambers. One of these chambers 106 is open to atmosphere through an orifice 107, whereas the other chamber 108 is closed except for a pipe connection 109 and pipe line 111 which connects the chamber 108 with a control valve 112, presently to be described. Connecting the diaphragm 105 of each power device is a rod 113, the two rods 113, 113 extending transversely of the housing 79 and being each connected to the lever arm 98 and to each other by a pin 114. A compression spring 115, disposed in the chamber 108 between the diaphragm 105 and the end wall 116 of the casing 104, tends to hold the lever arm 98 in mid position.

For urging the lever arm 98 to neutral position the frame member 94 is equipped with a pair of standards 117, one standard 117 being mounted adjacent each of the flanges 103 to which the vacuum power devices 101 and 102 are fastened. Each standard 117 forms a fulcrum for a lever 118, the opposite end 119 of which bears against a boss 120 on the housing 79. A resilient compression element, such as a helical spring 121, is arranged between the frame member 94 and the lever 118 for urging the lever upwardly in opposition to the turning moment of the housing 79 as created either by the oppositely disposed lever 118 or by operation of one or the other of the vacuum power devices 101 and 102. For limiting the upward movement of each lever 118 there is provided a loose connection between each of the levers 118 and the frame member 94 formed, in this instance, by a rod 122 pivotally connected at its upper end to the lever 118 by means of a pin 123 and bearing on its lower end a nut 124. The rod 122 extends through an aperture 125 in the frame member 94 and is freely slidable therein, the nut 124 engaging the under surface of the frame member 94 for limiting upward movement of the lever.

With the lever arm 98 in neutral position the friction cone 80 is held out of engagement with either side of the friction wheel 81 and the load raising and lowering means are held stationary. When, however, the lever arm 98 is moved in one direction or the other, the friction cone 80 engages one side or the other of the friction wheel 81 and rotation of the drive shaft 17 is transmitted therethrough to drive the shaft 58 and actuate the lift chains 56. The direction of operation of the lift chains 56 is determined by the direction of rotation of the friction wheel 81. Assuming rotation of the drive shaft 17 in the direction indicated by the arrow 126 in Figure 6, movement of the lever arm 98 to the right will cause rotation of the friction wheel in the clockwise direction, whereas movement of the lever arm 98 to the left will cause rotation of the friction wheel in the counterclockwise direction. In one direction of rotation of the friction wheel the lift chains 56 are actuated to raise the load engaging shoes, while rotation of the friction wheel in the opposite direction operates to lower the load engaging shoes.

A cam roller 127 mounted on the upper end of an arm 128 engages in the recess 100 between the cam surfaces 99 during the times that the lever arm 98 and shaft 77 are in neutral position. The arm 128 and cam roller 127 are part of a brake mechanism comprising a lever 129 fulcrumed on the end of a bolt 131 and extending longitudinally beneath the friction wheel 81. The bolt 131 depends somewhat below the frame member 94, a compression spring 132 being positioned between the frame member 94 and the end of the lever 129 to give resiliency to the brake mechanism.

The lever 129 extends to a point beneath the housing 79 where its free end is supported by a compression spring 133 mounted on a bolt 134. The spring 133 bears at one end against a nut 135 threaded on the bolt and at the other end against the under side of the lever 129, and urges the lever 129 upwardly in opposition to the downward thrust on the cam roller 127. A brake shoe 136, V-shaped in cross section, is mounted on the lever 129 in position to be held thereby against the inner faces of the friction wheel 81 at such times as the shaft 77 is in neutral position and the cam roller 127 engages in the recess 100. When, however, the lever arm 98 is moved either to the left or right to cause the friction cone 80 to engage one or the other of the frusto cones comprising the friction wheel, the cam roller 127 rides upon one or the other of the cam surfaces 99 and moves the lever 129 downwardly in opposition to the action of the spring 133. Downward movement of the lever 129 moves the brake shoe 136 away from the friction wheel 81 and thus releases the wheel. The cam surfaces 99 are so designed as to cause the brake shoe to be moved away from the friction wheel simultaneously as the friction cone 80 engages the frusto cone.

Control mechanism

The control mechanism for operating the load engaging shoes 27 and the lift chains 56 may include the engine manifold 137, a vacuum pump or any suitable means for producing vacuum. A conduit 138 connects the manifold 137 with a check valve 139, and a conduit 141 connects the check valve with a vacuum reservoir 142. A conduit 143 provides communication between the vacuum reservoir 142 and the control valve 144. Conduit 141 connects ahead of the check valve 139 with conduit 145, providing communication between the vacuum reservoir 142 and control valve 112.

It will be remembered that the swing posts 28 are journaled in bearings 32 mounted on slides 33 adapted for limited movement transversely of the frame 10 through operation of toggle links 38—41 which in turn are controlled by rotation of the shaft 44. Rotation of shaft 44 is controlled by a servo-motor comprising a cylinder 146 within which is mounted a piston having a piston rod 147 connected by suitable coupling means to a lever 148 fastened to the shaft 44. The cylinder 146 is connected with the vacuum reservoir 142 by way of the conduits 149 and 151, control valve 144, and conduit 143. The valve 144 may be of any suitable type well known in the art, and may be connected through suitable linkage to an operating lever 152 mounted in the operator's compartment. By control of the valve 144 either of the opposite ends of the cylinder 146 may be placed in communication with the vacuum reservoir 142 while the other end of the cylinder is opened to atmosphere. The valve 144 is connected to the operating lever 152 by way of a link 153 connected to the valve 144 and a link 154 connected to the operating lever 152, the two links being interconnected by means of a cross lever 155.

It will be noted that the operating lever 152 is fulcrumed intermediate its ends on the upstanding arm 156 of the lever 157, having a tubular portion 158 journaled in bearings 159 secured to a plate 161 comprising a part of the frame of the vehicle. The lever 157 is connected through suitable linkage 162 to the control valve 112 which controls the action of the vacuum power devices 101 and 102.

The operating lever 152 may be moved to the left and to the right, pivoting during such movements on the pin 163 mounted in the arm 156 of the lever 157. Movement of the operating lever 152 to the right actuates the valve 144 to open one end of the cylinder 146 to atmosphere and place the opposite end of the cylinder 146 in communication with the vacuum reservoir 142. Thus the piston and piston rod 147 are moved in a predetermined direction to rotate the shafts 44 and 37 to shift the slides 33 for moving the swing posts 28 and load engaging shoes 27 into or out of engagement with a load. Assuming that movement of the operating lever 152 to the right operates to move the load engaging shoes into engagement with the load, then movement of the operating lever 152 in the opposite direction, or to the left, actuates the valve 144 to close the aforementioned end of the cylinder 146 to atmosphere and provide communication between said end and the vacuum reservoir 142, and to close the conduit between the vacuum reservoir and the opposite end of the cylinder and open said opposite end to atmosphere. By this means shafts 44 and 37 are rotated in the opposite direction from that hereinbefore described, and swing posts 28 and load engaging shoes 27 are moved out of engagement with the load.

The operating lever 152 is also adapted for movement both in a forward direction and in a rearward direction from the neutral position. Movement of the lever in one of these directions, for example, forwardly of the truck, actuates the valve 112 so as to place the chamber 108 of the vacuum power device 102 in communication with the vacuum reservoir 142, at the same time opening the chamber 108 in vacuum power device 101 to atmosphere. Operation of the valve in this manner will cause the diaphragm 105 in vacuum power device 102 to move toward the end wall 116 against the resistance offered by spring 115. Thus the housing 79 is rotated in the direction of the vacuum power device 102 and moves the friction cone 80 into engagement with the frusto cone on the right hand side of the friction wheel 21. At the same time, the cam roller 127 engages the cam surface 99 to depress the lever arm 129 against the action of the spring 133 and move the brake shoe 136 out of engagement with the friction wheel 81. Rotation of the drive shaft 17 being imparted to the shafts 87, and from thence through gears 90—91 to the shafts 58, the sprockets 57 are rotated in a predetermined direction to cause the lift chains 56 to raise or lower the cross head 65 to which shoes 27 are attached by means of the link 72. Assuming that movement of the operating lever 152 forwardly of the truck operates through the mechanism just described to raise the load engaging shoes 27, the movement of the operating lever 152 in the opposite direction, or rearwardly of the truck, actuates the control valve 112 to open the chamber 108 in vacuum power device 102 to atmosphere and to place chamber 108 in vacuum power device 101 in communication with vacuum reservoir 142, whereupon the friction cone 80 is moved into engagement with the left hand side of the friction wheel 81 and the cross shaft 87 is rotated in the opposite direction to lower the shoes 27.

Means is provided to arrest movement of the cross heads 65 whenever the cross heads approach the limits of their movements in the grooved tracks 64. It will be remembered that operation of the lift chains 56 is controlled by a friction drive which is actuated by vacuum power devices 101 and 102, and that in turn the operation of these vacuum power devices is controlled by a valve 112. The valve is actuated by a lever 157 connected to the valve by means of linkage 162. Fastened on the link 162 in spaced apart relation are collars 164 and 165. Extending between the collars 164 and 165 is one arm 166 of a bell crank 167 journaled on an upstanding pin 170 fastened in the deck of the truck frame. The other arm 168 of the bell crank 167 is connected by a link 169 to the arm 171 of a bell crank 172 journaled on the frame 10. A link 173 extends through the deck of the truck and is positioned adjacent the grooved track 64 in the frame 63. Fastened to the link 173 a short distance beneath the deck of the truck is a collar 174 having a stop member 175 extending into the path of movement of the cross head 65. Fastened to the lower end of the link 173 is a second collar 176 equipped with a stop member 177 likewise extending into the path of movement of the cross head 75. A pin 178 projecting horizontally from the cross head 65 is so arranged as to strike the stop member 175 as the cross head approaches its upper limit of movement and to strike the stop member 177 as the cross head approaches its lower limit of movement. In either instance movement of the link 173 in the vertical direction is transmitted through bell crank 172 and link 169 to bell crank 167 which in turn moves the link 162 in the direction necessary to restore the valve 112 to neutral position. In the neutral position of the valve 112 chambers 108 in vacuum power devices 101 and 102 are subjected to equal vacuum by way of the connection with the vacuum reservoir through the valve 112, and the lever 98 returned to neutral position. At the same time the brake shoe 136 is moved into engagement with the friction wheel 81 to stop movement of the load raising and lowering means as hereinbefore described.

Operation

In operation of a straddle truck embodying the construction hereinabove described, as the truck is driven over a load to be carried the operator manipulates the operating lever 152 to lower the load engaging shoes 27 as the truck approaches the load. Thereupon, the lever 152 is moved to the right to cause the load engaging shoes to move into engagement with the load, whereupon the lever 157 is rotated in the forward direction to cause the valve 112 to maintain the chamber 108 in vacuum power device 102 in communication with vacuum reservoir 142, at the same time opening the chamber 108 in vacuum power device 101 to atmosphere. Thus the friction cone 80 is moved into contact with the side of the friction wheel 81 which transmits the driving motion of the shaft 17 to the transverse shaft 87 to raise the load carrying shoes 27 and lift the load.

Upward movement of the load carrying shoes may continue until the load of lumber is clamped between the shoes and the under side of the frame 10, or movement of the load may be arrested at any desired position. When the load has been raised the operator moves the lever 157 to neutral position, thus actuating the valve 112 to cause chambers 108 in vacuum power devices 101 and 102 to be subjected to equal vacuum and so restore the lever 98 to neutral position. At the same time the brake shoe 136 is moved upwardly by force of the spring 133 into engagement with the friction wheel 81 and holds the load in the raised position. An advantage of the construction resides in the fact that the friction transmission for the hoisting mechanism permits a certain amount of slippage of the transmission elements, so that the load carried by the shoes 27 may be clamped tightly against the under side of the frame 10 without the necessity of exactly timing movement of the lever 157 by the operator. In other words, the friction drive acts as a slip clutch between the drive shaft 17 and the cross shafts 87, and eliminates distortion or breakage of the lifting mechanism which might otherwise result from badly timed manipulation of the operating lever if a gear transmission were used.

When the lift truck has transported the load to the place of unloading, the operator stops the carrier and moves the lever 157 in the required direction to move the elements of the valve 112 into position to actuate the transmission to drive the load carrying shoes downward. As the shoes 27 approach the lowermost limit of their movement, the pin 178 on the cross head 65 strikes the stop member 177 on the link 173 and actuates the bell crank 167 and link 162 to move the valve 112 to neutral position and so stop the downward movement of the load engaging shoes. Thereupon the operating lever 152 may be moved to the left to actuate the valve 144 and so cause the swing posts 28 to move to their outermost position for releasing the load.

Having now described my invention and in what manner the same may be used, what I claim as new and desire to protect by Letters Patent is:

1. In a straddle truck, a frame, a pair of grappling members mounted one on each side of said truck and movable inwardly into position to engage a load, toggle levers reacting between said frame and said grappling members in a manner to vary the lateral spacing of said grappling members, means for controlling the action of said toggle levers; a transmission mechanism for transmitting power for raising and lowering a load carried by said grappling members comprising a friction cone, a friction wheel engageable by said friction cone for being driven in either of opposite directions of rotation, means for moving said friction cone into engagement with said friction wheel, means for controlling the direction of movement of said last named means for determining the direction of rotation of said wheel; a lever mounted on said straddle truck, means interconnecting said lever and the means controlling said grappling members, and means for interconnecting said lever and the means for controlling movement of said friction cone, said lever being movable in one direction to actuate said grappling means and being movable in another direction to actuate said friction cone moving means.

2. In a straddle truck, a plurality of control mechanisms for controlling operation of the load carrying apparatus, a lever mounted on said truck comprising a member journaled for rotation in a direction longitudinally of said truck, an upstanding arm on said member, an arm pivoted intermediate its end on said first named arm for rotation about said pivot in a direction transversely of said truck, means connecting one end of said pivoted arm with one of said control mechanisms, and means connecting said member with another of said control mechanisms whereby movement of said arm in one direction rotates said member and actuates one control mechanism and movement of said arm in a direction at right angles to said first movement actuates the other of said control mechanisms.

3. In a straddle truck, a pair of grappling members mounted one on each side of said truck and movable inwardly into position to engage a load, power means comprising a prime mover for operating said grappling members, a load hoisting mechanism connected to said grappling members for raising and lowering a load carried thereby, power means comprising a prime mover for operating said hoisting mechanism, and a single control lever means connected with each said power means, and operable to actuate either one or both of said power means according to the direction of movement of said lever.

4. In a straddle truck, a pair of grappling members mounted one on each side of said truck and movable inwardly into position to engage a load, power means for operating said grappling members, a load hoisting mechanism connected to said grappling members for raising and lowering a load carried thereby, power means for operating said hoisting mechanism, said power means comprising a frame, an eccentric journaled in said frame, a shaft journaled in said eccentric, means for rotating said eccentric comprising a pair of vacuum power devices, means connecting each of said vacuum power devices with said eccentric, means for actuating a selected one of said vacuum power devices for rotating said eccentric in a predetermined direction, a lever mounted on said straddle truck, means interconnecting said lever and the means for operating said grappling member, and means interconnecting said lever and the means for actuating a selected one of said vacuum power devices, said lever being movable in one direction to actuate said grappling means and being movable in another direction to actuate a selected one of said vacuum power devices.

5. In a straddle truck, a pair of grappling members mounted one on each side of said truck and movable inwardly into position to engage a load, power means for operating said grappling members, a load hoisting mechanism connected to said grappling members for raising or lowering a load carried thereby, power means for operating said hoisting mechanism comprising a friction cone, a friction wheel engageable by said friction cone adapted to be driven in either of opposite directions of rotation, means connecting said friction wheel and said load hoisting mechanism, means for moving said friction cone into engagement with said friction wheel, and means for controlling the direction of movement of said last named means for determining the direction of rotation of said wheel, a control lever mounted on said straddle truck, means interconnecting said lever and the means for operating said grappling members, and means interconnecting said lever and the means for controlling the direction of rotation of said friction wheel.

6. In a straddle truck, a pair of grappling members mounted one on each side of said truck and movable inwardly into position to engage a load, means for operating said grappling members, a load hoisting mechanism connected to said grappling members for raising and lowering a load carried thereby, power means for operating said hoisting mechanism comprising a frame, an eccentric journaled in said frame, a drive shaft journaled in said eccentric, driving means mounted on said shaft, a driven shaft having driving connection with said load hoisting mechanism, means mounted on said driven shaft and engageable by said driving means for driving said driven shaft in either of opposite directions, and means for rotating said eccentric to cause said driving means to engage the means on the driven shaft for rotating said shaft in a predetermined direction, manually operable control means on said truck, means interconnecting said control means and the means for operating said grappling members, and means interconnecting said control means and the means for rotating said eccentric.

7. In a straddle truck, a pair of grappling members mounted one on each side of said truck and movable inwardly into position to engage a load, means for operating said grappling members, a load hoisting mechanism connected to said grappling members for raising and lowering a load carried thereby, power means for operating said hoisting mechanism comprising a frame, an eccentric journaled in said frame, a drive shaft journaled in said eccentric, driving means mounted on said shaft, a driven shaft having driving connection with said load hoisting mechanism, means mounted on said driven shaft and engageable by said driving means for driving said driven shaft in either of opposite directions, means for rotating said eccentric comprising a pair of vacuum power devices, means connecting each of said vacuum power devices with said eccentric, and means for actuating a selected one of said vacuum power devices for rotating said eccentric in a predetermined direction, a control lever mounted on said truck, means interconnecting said lever and the means for operating said grappling members, and means interconnecting said control lever and the means for actuating a selected one of said vacuum power devices.

8. In a straddle truck, a pair of grappling members mounted one on each side of said truck and movable inwardly into position to engage a load, means for operating said grappling members, a load hoisting mechanism connected to said grappling members for raising and lowering a load carried thereby, power means for operating said hoisting mechanism comprising a frame, an eccentric journaled in said frame, a drive shaft journaled in said eccentric, driving means mounted on said shaft, a driven shaft having driving connection with said load hoisting mechanism, means mounted on said driven shaft and engageable by said driving means for driving said driven shaft in either of opposite directions, means for rotating said eccentric to cause said driving means to engage the means on the driven shaft for rotating said shaft in a predetermined direction, a manually operable control member on said truck, means interconnecting said control member and the means for operating said grappling members, and means interconnecting said control member and the means for rotating said eccentric, a brake normally engaging said driven means, and means for moving said brake out of engagement with said driven means upon rotation of said eccentric.

9. In a straddle truck, a plurality of control mechanisms for controlling operation of the load carrying apparatus, a lever mounted on said truck comprising a member journaled for rotation in one direction, an upstanding arm on said member, an arm pivoted intermediate its ends on said first named arm for rotation about said pivot in another direction, means conecting one end of said pivoted arm with one of said control mechanisms, and means connecting said member with another of said control mechanisms whereby movement of said arm in one direction rotates said member and actuates one control mechanism and movement of said arm in another direction actuates the other of said control mechanisms.

HENRY N. DIMICK.